March 16, 1937. R. W. ROSS 2,074,117
EXHIBITING INSTRUMENT
Filed Aug. 17, 1934   3 Sheets-Sheet 1

INVENTOR.
Raymond W. Ross
BY Cornelius L. Ehret
his ATTORNEY

March 16, 1937.  R. W. ROSS  2,074,117
EXHIBITING INSTRUMENT
Filed Aug. 17, 1934   3 Sheets-Sheet 2
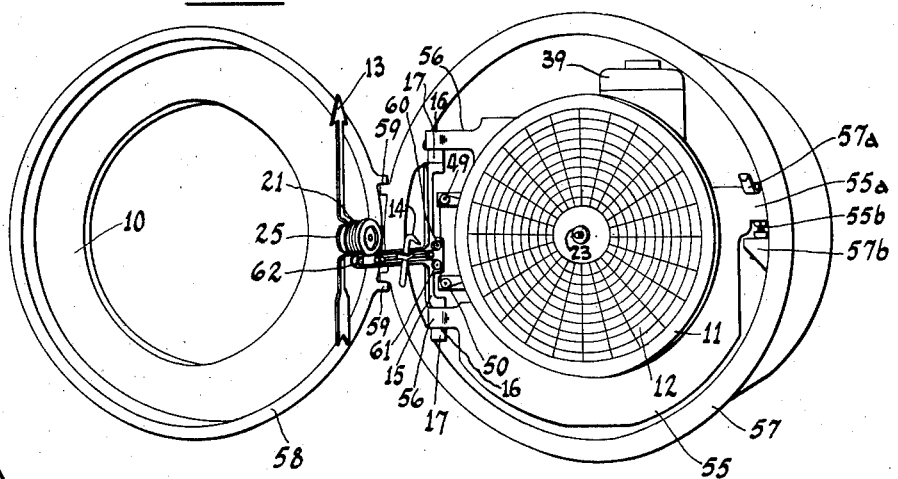
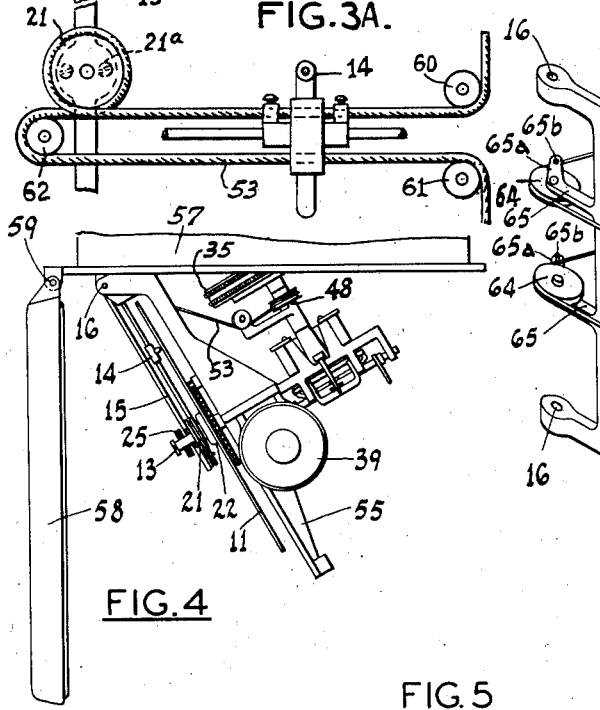
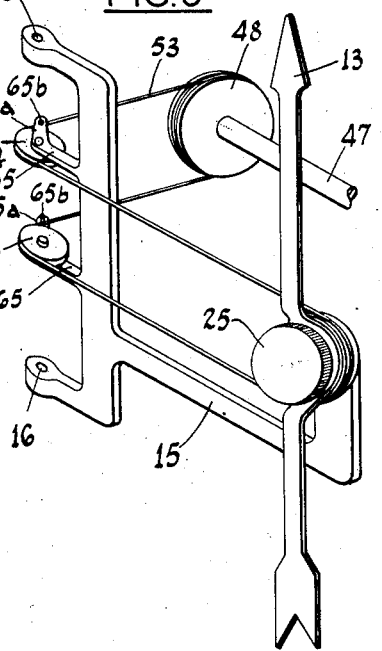
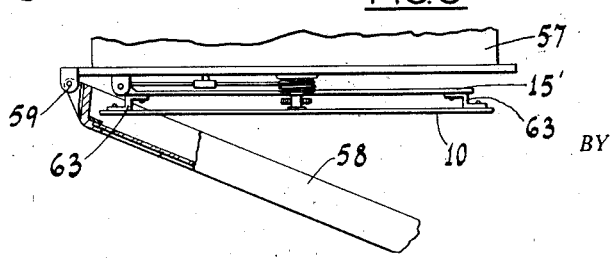
INVENTOR.
Raymond H. Ross
BY
Cornelius D. Ehret
his ATTORNEY.

March 16, 1937.    R. W. ROSS    2,074,117
EXHIBITING INSTRUMENT
Filed Aug. 17, 1934    3 Sheets-Sheet 3
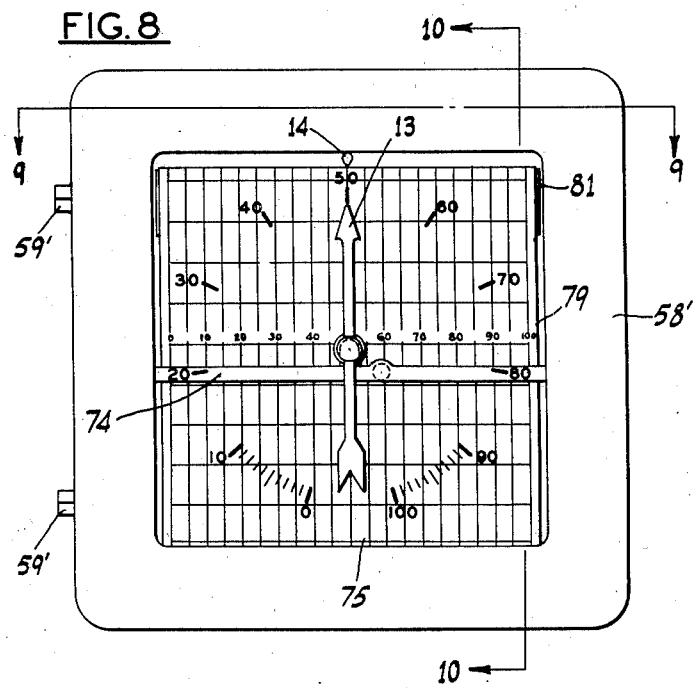
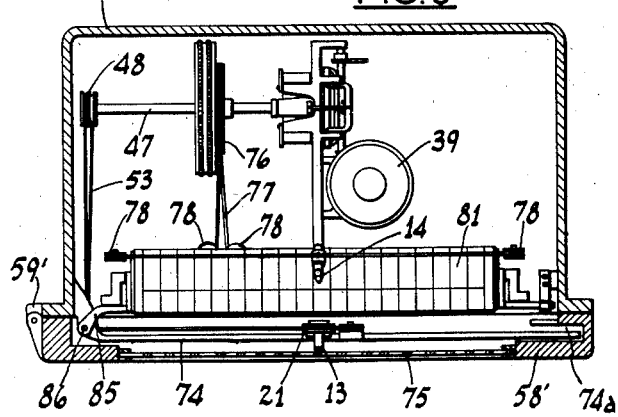
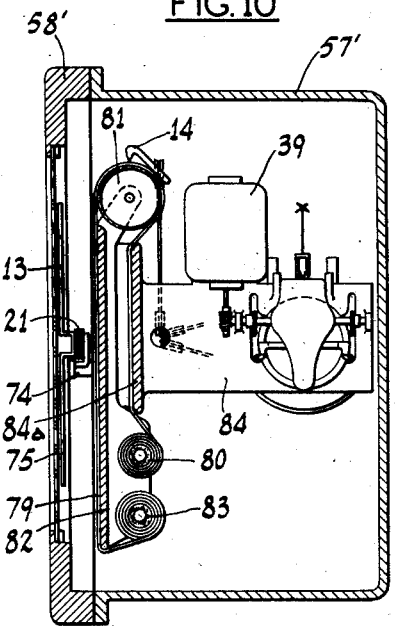
INVENTOR.
Raymond W. Ross
BY
Cornelius L. Ehret
his ATTORNEY.

Patented Mar. 16, 1937

2,074,117

UNITED STATES PATENT OFFICE 2,074,117

EXHIBITING INSTRUMENT

Raymond W. Ross, Philadelphia, Pa., assignor to Leeds and Northrup Company, Philadelphia, Pa., a corporation of Pennsylvania Application August 17, 1934, Serial No. 740,260

18 Claims. (Cl. 234—1)

My invention relates to new and improved instruments and more particularly to exhibiting instruments for indicating and/or recording changes in magnitude of a condition to be measured.

More specifically, my invention relates to a combined indicator-recorder which is compact in arrangement, which has a maximum visibility of the indicating element and a minimum of interference between the indicating and recording mechanisms and in which inspection, repair, and replacement of parts and replacement of the recorder chart may be effected with maximum facility.

In accordance with my invention, a combined indicator-recorder is provided with a controlling or driving structure which, for example, may be movable in response to changes in magnitude of a condition to be measured. There is also provided a driven or controlled structure actuated by the controlling member and comprising, for example, an indicator and/or a marker, such as a pen, stylus or the like, cooperating with a scale, markable element, or chart of the instrument. The controlled or driven structure is supported or mounted on a member pivotally interconnected with the driving structure. For example, the driving structure may be mounted in an enclosing casing or housing and the supporting member may be pivotally mounted thereon. The driving connection between the driving and driven structures is independent of relative pivotal motion between the driving structure and the supporting member. Specifically, this driving connection may include one or more elements disposed substantially in the axis of the pivotal interconnection between the driving structure and the supporting member. By this means the indicator and/or marker and their supporting member may be swung away from the chart, generally associated with the driving structure in the enclosing housing, to facilitate inspection, repair, or replacement of parts or replacement of the chart. There is also preferably provided a fastener freely supported from the pivoted member and detachably engaging the chart-carrying member or a part of the stationary housing to retain the pivoted member in operative relationship. Also, if desired, the entire indicator-recorder mechanism may be pivotally supported in the enclosing housing and swung free therefrom for inspection, repair or replacement of parts.

For a better understanding of my invention, together with other and further features thereof, reference is had to the following description taken in connection with the accompanying drawings, and its scope will be pointed out in the appended claims.

In the drawings, Fig. 1 is a perspective view of a combined indicator-recorder embodying my invention in which the scale and record chart and chart-plate are partly broken away for the sake of clarity;

Fig. 3 is a perspective assembly view of an indicator-recorder including a modified driving connection to the indicator and marker;

Fig. 3A is an enlarged fractional elevation of a part of Fig. 3, the pivoted bracket being omitted more clearly to show the manner in which the driving cord is supported on the driven and idler pulleys as well as the connection of the pen and index to the cord;

Fig. 4 is a plan view of the apparatus of Fig. 3, showing the indicator-recorder structure swung partly out of its enclosing casing;

Fig. 5 is a plan view, partly in section, of a modified support for the indicator scale;

Figs. 6 and 7 are schematic diagrams of modified drives for the indicator and marker elements;

Fig. 8 is a front elevation of an indicator-recorder and of a modified support and driving element for the indicator and marker, while Figs. 9 and 10 are, respectively, cross-sectional views along the lines 9—9 and 10—10 of Fig. 8.

Figure 1:
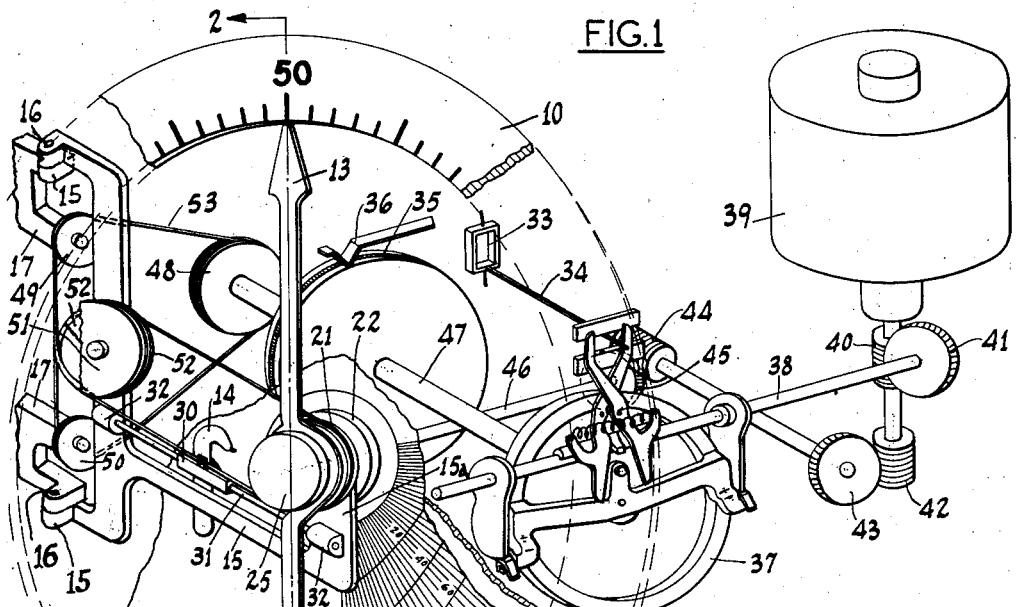
Figure 2:
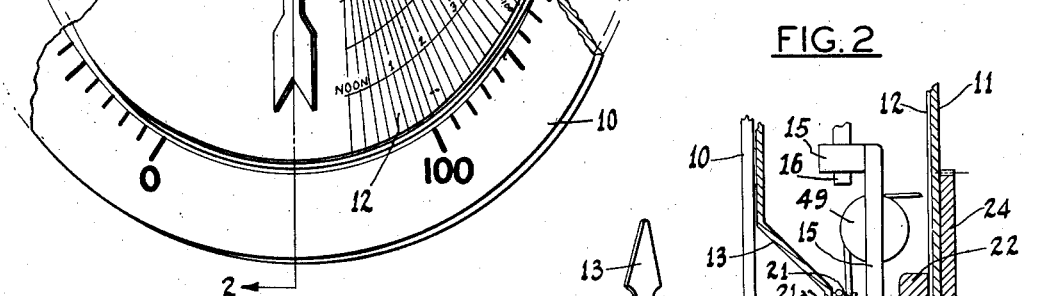
Fig. 2 is a cross-sectional detail view through the indicator and supporting structure therefor taken along the line 2—2 of Fig. 1.

Referring now more particularly to Figs. 1 and 2 of the drawings, there is shown a combined indicator-recorder embodying my invention, comprising an annular scale 10 concentric with and surrounding a circular rotatable chart support 11 adapted to receive a markable element, as a circular recorder chart 12. Cooperating with the scale 10 and the chart 12 are an indicator 13 and a marker 14. The indicator 13 is preferably of bold outline, as indicated, and contrasting color and extends substantially across the diameter of the annular scale. The marker 14 may comprise a pen, stylus, print-wheel or any suitable recording device for in any way effecting on the chart a record in the form of a continuous line or a series of spaced markings.

The indicator 13 and marker 14 are carried by an arm or bracket 15 pivotally supported at 16—16 from portions 17 of the supporting housing or casing of the instrument. The indicator 13 is secured to a pulley 21 by screws 21a. A bushing 18 is secured in the upstanding end 15a of the bracket 15 concentric with the scale 10 and the chart support 11. The pulley 21 is journalled on the bushing 18. Loosely mounted in bushing 18 is a nut 22 adapted detachably to engage the threaded end portion of a shaft 23 upon which is secured a driving gear 24 and the circular chart support 11. The nut 22 is provided with a central stem 22a which is retained within the bushing 18 by means of a knurled operating knob or disc 25 threaded on the end of the stem 22a and secured in position by suitable set screw 26. It will be noted that a loose fit is provided between the bushing 18 and the stem 22a of the nut 22, so that no binding may occur therebetween. The marker 14 is supported in a carriage 30 which is slidably mounted on a rod 31 extending longitudinally of the bracket 15 and supported by lugs or ears 32 extending therefrom.

While any suitable type of mechanism may be utilized in connection with my invention for actuating the indicator 13 and the marker 14 in response to changes in magnitude of a condition to be measured, there is shown in Fig. 1 the essential features of one mechanism which is particularly suitable for use in connection therewith and which is shown and described in U. S. Letters Patent No. 1,935,732, granted November 21, 1933, upon the application of Lloyd Y. Squibb, to which reference is made for a detailed description thereof. In general, this mechanism includes an indicating device, such as a galvanometer 33 provided with a deflecting needle 34 and connected to be responsive to the condition which it is desired to indicate and/or record. The mechanism includes, also, a slide wire 35, together with a stationary contact 36, the position of the slide wire 35 being intermittently adjusted in accordance with the deflection of the needle 34 by means of a clutch disc 37 and suitable cam mechanism driven by a continuously rotating shaft 38. The shaft 38 is driven by a motor 39 through gearing 40, 41. The motor 39 may also be utilized to rotate the chart support 11 through gearing 42—43 and 44—45 and shaft 46, which may be connected directly to the chart support 11 in which case the shaft 23 coincides with or is replaced by shaft 46. If further speed reduction is desired a gear (not shown) supported on shaft 46 may mesh with the gear 24, Fig. 2.

The motion of the slide wire 35, which is a measure of the change in magnitude of the condition to be measured, is preferably transmitted to the indicator 13 and the marker 14 by a driving system independent of the pivotal motion of the bracket 15 upon which the indicator and marker are supported. In the system illustrated, the shaft 47, upon which the slidewire 35 is mounted, is extended and carries a pulley 48. A pair of pulleys 49 and 50 are supported from the members 17 and are substantially tangent to the pivotal axis of the bracket 15. A pair of pulleys 51 and 52 are supported from the bracket 15 also substantially tangent to the pivotal axis of the bracket 15. The pulley 21 is preferably of the same diameter as the pulleys 51 and 52. A motion-transmitting means shown as an endless cord or belt 53 interconnects the several pulleys, as shown clearly in Fig. 1, passing over the portions of the pulleys tangent to the pivotal axis of the bracket 15 and a portion thereof lying substantially in the pivotal axis; specifically, the cord 53 passes over pulley 49, then downwardly and under pulley 51 then under and over pulley 21, thence over pulley 52 and downwardly under pulley 50, and finally under and over pulley 48. The cord between pulleys 51 and 21 is connected to the marker carriage.

The operation of the above-described apparatus for effecting movement of the slidewire 35 in accordance with changes of magnitude of a condition to be measured will be well understood by those skilled in the art, or will be found explained in detail in the above-mentioned Squibb patent. In brief, the slidewire 35 is connected in a balancing circuit with the galvanometer 33. Upon a change in the condition under measurement, the galvanometer becomes unbalanced, causing the needle 34 to deflect in a given direction. The needle is periodically clamped in its deflected position and intermittently operated feelers, a clutch arm, and the continuously operating cams attached to the shaft 38 operate through the clutch disc 37 intermittently to move the shaft 47 and the slidewire 35 by an amount proportional to the deflection of the needle 34. This movement is transmitted by means of the driving pulley 48 to the endless cord or belt 53 which, in turn, transmits the motion to the pulley 21, as above described, rotating the indicator 13 to indicate the desired quantity and simultaneously sliding the marker 14 along the rod 31 to effect a corresponding change in the recorded quantity. The relationship of the parts is such that the pointer 14 moves radially of the chart 12 which therefore may have radial time lines. As stated above, the indicator 13 is preferably of bold outline and contrasting color and extends substantially across the record chart 12, providing a maximum visibility of the indication of the instrument. At the same time, the relative motions of the indicator 13 and the marker 14 are without mechanical interference and the narrow bracket 15, mounted behind the indicator 13, offers no obstruction to the visibility of the indicating element of the instrument.

When it is desired to replace the chart 12, the nut 22 is unscrewed from the end of the shaft 23 by the knob 25 after which, (as indicated in Fig. 3 with respect to a modified indicator and marker drive) the bracket 15 is free to swing about its pivot 16—16 so that the chart 12 may be removed and a new chart attached to the chart support 11 without obstruction. It will be noted that, as the bracket 15 and indicator 13 are swung free of the chart, the marker is also swung away therefrom, precluding any false marks on the chart during replacement or adjustment. The bracket 15 is then swung into normal or operative position and the knob 25 is operated to engage the nut 22 and the threaded shaft 23 to retain the supporting bracket 15 in its operative relationship. In this position, it will be noted that the nut 22 engages and clamps the chart 12 to the chart support 11. At the same time, when the bracket 15 is swung from its operative position for replacement of the chart, the nut 22 is retained by its loosely fitting support within the bushing 18 to avoid loss of the nut 22 and to maintain it in approximate position for subsequent engagement of the shaft 23.

As the bracket is swung into and out of operative relationship about its pivots 16, the length of the driving cord or belt 53 is not changed, since the pulleys 49, 50, 51 and 52 are all substantially tangent to the pivotal axis of the bracket 15. By this means, it may be swung into and out of operative relationship without affecting the driving connection between the pulley 48, which constitutes the driving or controlling structure, and the indicator 13 and marker 14, which comprise driven exhibiting elements or structures.

In Figs. 3 and 4 is shown an exhibiting instrument whose indicator and recorder structures are mounted in an enclosing housing. The driving or controlling structure comprising the motor 39 and the elements driven thereby are supported in a frame 55 provided with projecting arms or lugs 56 pivotally mounted coaxial with the pivotal mounting of the bracket 15. As shown, they are both pivoted in the extending projections 17 of the supporting and enclosing housing 57. The frame 55 has a projecting arm 55a adapted to engage a latch 57a to retain it in the casing 57 and the arm 55a is provided with a rest 55b cooperating with a bracket 57b projecting from the casing to maintain an accurate positioning of the frame 55 within the casing. Cooperating with the housing 57 is a cover 58 hinged to the casing 57 at 59.

In the arrangement of Fig. 3, also, the driving connection between the controlling structure and the indicator 13 and marker 14 has been modified so that both sides of the endless cord or belt 53 between the pivotal axis of the bracket 15 and the indicator 13 are concealed behind the bracket 15, thus minimizing the visual interference with the chart 12. To this end the coaxially mounted pulleys 51 and 52 of Fig. 1 are replaced by a pair of pulleys 60 and 61, the cord 53 passing between these two pulleys, rather than over and above them as in the arrangement of Fig. 1, and thence to a guide pulley 62 and to the pulley 21 secured to the indicator 13. One side of the cord 53 between the pulleys 60, 61 and 62 is, of course, attached to the carriage of the marker 14. As in the case of Fig. 1, the idler pulleys 49, 50, 60 and 61 support the endless belt or cord 53 for movement along a path which coincides with the pivotal axis of the bracket or supporting arm 15. In consequence the arm or bracket 15 may be moved from a position closely adjacent to and in front of the chart to the position shown in Fig. 3 without moving either the pen 14 or the index 13. The driving connection between the driving and driven structures is maintained throughout the aforesaid pivotal movement of the arm or bracket 15.

A modified mounting of the scale 10 is shown in Fig. 5 in which it is supported by means of auxiliary brackets 63 from the pivotally mounted bracket 15' extending entirely across the face of the chart 12, rather than to the center thereof, as the bracket 15 of Fig. 1.

A simplified driving connection between the driving or controlling structure and the indicator 13 is shown in Fig. 6 in which the four pulleys 49, 50, 51 and 52 of Fig. 1 are replaced by a pair of pulleys 64 mounted coaxially with the pivotal support 16 of the bracket 15. The pulleys 64 may be supported from projecting arms 65 of the bracket 15. These arms are provided with extensions 65a and cooperating pins 65b engaging the cord 53 and maintaining a substantially constant arc of engagement between the cord 53 and the pulleys 64 and avoiding the loosening or slackening of the cord which would otherwise be occasioned by a pivotal movement of the bracket 15.

Figure 7:
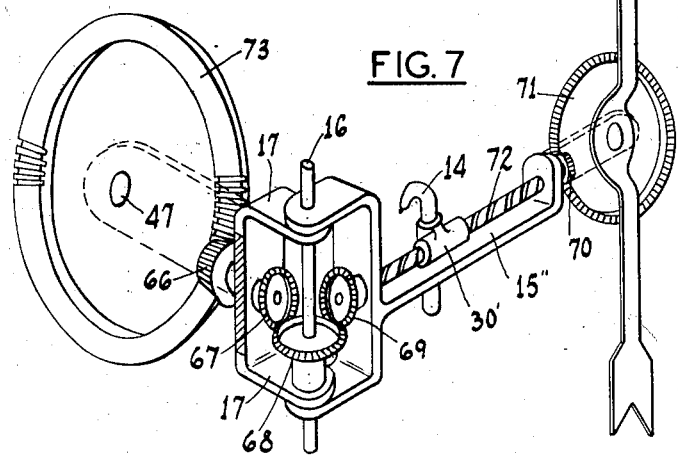

In Fig. 7 is shown a modified driving connection between the controlling or driving shaft 47 and indicator 13 and marker 14. In this modification, a bevel gear 73 replaces the pulley 48 of Fig. 1 and cooperates with a bevel gear 66 which, in turn, drives a bevel gear 67 engaging a complementary bevel gear 68 mounted on the common pivot 16 of the swinging bracket 15" supporting the pointer 13 and marker 14. The bevel gear 68, in turn, drives a complementary bevel gear 69 journalled in the bracket 15", corresponding to the bracket 15 of Fig. 1. The gear 69 is attached to the shaft 72 and drives the indicator 13 through the gearing 70—71, the gear 71 replacing the pulley 21 of Fig. 1. The shaft 72, interconnecting the bevel gear 69 and the gear 70, is suitably threaded and engages the carriage 30' of the marker 14 to propel the marker 14 proportionally to the movement of the indicator 13. With such an arrangement, a positive driving connection is established between the controlling shaft 47 and the indicator 13 and marker 14. This driving connection is substantially independent of relative pivotal movement between the bracket 15" and the supporting arms 17 on which it is pivoted. Although, assuming a given position of the shaft 47, a pivotal motion of the bracket 15" will produce a motion of the marker 14 and indicator 13, a return of the bracket 15" to operative relationship will produce an exactly equal movement in the opposite direction so that after each motion of the bracket 15" about its pivot 16 and return to operative relationship, the indicator 13 and marker 14 are also returned to the correct positions corresponding to the position of the shaft 47.

In Figs. 8, 9 and 10 is illustrated the embodiment of my invention in an indicator-recorder of the strip chart type. In such an instrument it is preferable to utilize a rectangular casing, rather than a circular one as in the foregoing arrangements. In this embodiment, a square case 57' is provided with a cooperating cover 58' hinged at 59', and is otherwise similar to the enclosing housing of Fig. 3. The indicator 13 is supported from a pivoted bracket 74 extending completely across the face of the instrument and engaging the cover 58' at 74a to procure the proper positioning thereof. The driving connection from the controlling or driving shaft 47 to the indicator 13 is similar in all respects to that of Fig. 3. In this case, however, the scale with which the indicator cooperates is marked upon a glass plate 75 forming the central portion of the cover member 58'.

In the apparatus of Figs. 8, 9 and 10, a modified driving connection from the shaft 47 to the marker 14 is illustrated. This comprises a driving pulley 76 mounted on the shaft 47 and an endless cord or driving belt 77 which passes around a plurality of idler or guide pulleys 78 engaging the marker 14 and producing a movement thereof proportional to the movement of the indicator 13. The chart strip 79 is supplied by a feed roll 80 and passes thence upwardly over a chart drum 81 with which the marker 14 cooperates, thence downwardly over a chart plate or support 82 and to a rewind drum 83. The chart drum 81 and rewind drum 83 may be driven by any suitable mechanism. The drums or rolls 80, 81 and 83 and the chart plate 82 are supported from a frame 84a which may be unitary with the main frame 84 supporting the driving or controlling structure, as illustrated, or may be supported separately therefrom, as shown in copending application of Ross and Seberhagen, Serial No. 714,546, filed March 8, 1934. The main frame 84 may be pivoted by means of brackets or extensions 85 mounted on a suitable pivot 86 common to the indicator bracket 74. While only the essential elements of an indicator-recorder are illustrated and described in Figs. 8, 9 and 10, the principles involved and the manner of their application to the particular physical structure are similar to those of the preceding figures and are believed adequate to enable one skilled in the art to practice the invention.

The operation of this strip chart indicator is similar to that described above. The combined indicator-recorder structure may be swung out of its enclosing casing 57' for inspection, repair or replacement, or the indicator and its supporting bracket may be individually moved about its pivot 86 to clear the record chart 79 to facilitate inspection or replacement thereof. Due to the driving connection between the controlling structure and the indicator 13, the motion of the latter about the pivot 86 has substantially no effect upon the driving connection.

Thus, there is provided a combined indicator-recorder of either the round-chart or strip-chart type in which the indicator or marker or both are supported on a structure movable away from their cooperating scale or chart and in which the driving connection from the movable structure, responsive to changes in magnitude of the condition to be measured, and the indicator and/or marker is substantially independent of relative pivotal motion between the indicator and marker and the controlling structure.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim is:

1. An instrument comprising driving structure, a supporting member, said driving structure and supporting member being pivotally interconnected for relative movement, movable driven structure supported from said member, and means for driving said driven structure from said driving structure comprising a cord and pulley driving connection including a plurality of pulleys disposed substantially at the axis of the pivotal interconnection of said supporting member and said driving structure.

2. An instrument comprising driving structure, a supporting member, said driving structure and supporting member being pivotally interconnected for relative movement, movable driven structure supported from said member, and means for driving said driven structure from said driving structure comprising a cord and pulley driving connection including a plurality of pulleys disposed tangential to the axis of the pivotal interconnection of said supporting member and said driving structure.

3. An instrument comprising driving structure, a supporting member, said driving structure and supporting member being pivotally interconnected for relative movement, movable driven structure supported from said member, and means for driving said driven structure from said driving structure comprising a cord and pulley driving connection including a pair of pulleys supported from said member and a pair of pulleys supported with said driving structure, said pulleys being tangential to the axis of the pivotal interconnection of said supporting member and said driving structure.

4. A recording instrument comprising an element movable in response to changes in magnitude of a condition to be measured, a chart driving member, a pivotally mounted member extending adjacent said chart driving member, a movable member supported from said pivotally mounted member, a driving connection between said element and said movable member, and a detachable chart fastener including structure freely supported from said pivotally mounted member and normally operative to retain said pivotally mounted member in operative relationship.

5. An instrument comprising an element movable in response to changes in magnitude of a condition, movable exhibiting structure, a pivotally mounted member for carrying said structure, and a driving system for transmitting motion of said element to said structure having a portion carried by said member and connected to another portion substantially in the pivotal axis of said member.

6. An instrument comprising an element movable in response to changes in magnitude of a condition, a scale, exhibiting structure movable in front of said scale, a member for carrying said structure pivotally mounted beyond the periphery of said scale and extending in front thereof, and a driving system for transmitting motion of said element to said structure having a portion carried by said member and connected to another portion substantially in the pivotal axis of said member.

7. An instrument comprising a support, a bracket mounted on said support for rotation about a pivotal axis, exhibiting structure supported on said bracket and movable relatively thereto, actuating mechanism for said structure, and motion-transmitting means interconnecting said mechanism and said structure, the axis of one portion of said motion-transmitting means for all pivotal positions of said bracket coinciding with said pivotal axis.

8. An instrument comprising a support, a bracket mounted on said support for rotation about a pivotal axis, exhibiting structure including at least one movable member supported on said bracket and movable relatively thereto, motion-transmitting means, one portion thereof being carried by said bracket for driving said one member, and another portion thereof being in alinement with said pivotal axis so that pivotal movement of said bracket does not change the position of said one member with respect to said bracket.

9. An instrument comprising a frame supporting a driving element movable in response to changes in the magnitude of a condition, a bracket, and means interconnecting said frame and said bracket for relative movement about a common pivotal axis, exhibiting structure supported on said bracket and movable relatively thereto, means for driving said structure under the control of said element comprising a cord interconnecting said element and said structure, and means for supporting a portion of said cord in a path of movement which coincides with said pivotal axis.

10. An instrument comprising a frame supporting a driving element movable in response to changes in the magnitude of a condition, a bracket, and means interconnecting said frame and said bracket for relative movement about a common pivotal axis, exhibiting structure supported on said bracket and movable relatively thereto, means for driving said structure under the control of said element comprising a cord interconnecting said element and said structure, and a plurality of pulleys supporting said cord and predetermining its path of movement, one pair of pulleys being mounted on said frame with cord-supporting portions tangential to said pivotal axis, and at least one pulley being mounted on said bracket with a cord-supporting portion tangential to said axis for all pivotal positions of said bracket, whereby pivotal movement of said bracket does not cause relative movement of said structure with respect to said bracket.

11. An instrument comprising a frame supporting a driving member, exhibiting structure having a movable element, a pivoted bracket supporting said element, a driving connection between said member and said element comprising a cord extending from said member to the pivotal axis of said bracket, thence into driving engagement with said element, and from said element back to said pivotal axis and to said member, and means adjacent said pivotal axis for supporting a portion of said cord substantially in alinement with said pivotal axis.

12. An instrument comprising a frame, actuating mechanism supported on said frame and including a driving pulley, exhibiting structure having a movable element, a bracket supporting said element, means interconnecting said frame and said bracket for relative movement about a common pivotal axis, a driven pulley supported on said bracket, said bracket being displaced from said driving pulley, idler pulleys supported along the pivotal axis of said bracket and an endless belt supported on said driving pulley, said idler pulleys, and said driven pulley, for driving said movable element, said idler pulleys retaining a portion of said belt in substantial alinement with said pivotal axis.

13. An instrument comprising a frame, an element movable in response to changes in magnitude of a condition, a scale positioned forwardly of said element, exhibiting structure movable in front of said scale, a bracket for carrying said structure pivotally mounted beyond the periphery of said scale and extending in front thereof, a driven pulley supported on said bracket, idler pulleys adjacent the pivotal axis of said bracket and respectively supported on said bracket and said frame, and an endless belt supported on said element, said idler pulleys, and said driven pulleys, for driving said structure, said idler pulleys supporting said belt in substantial alinement with said pivotal axis.

14. An instrument comprising a markable element, a driving member therefor, a marker, a bracket supporting said marker and movable about a pivotal axis, securing means including structure for engaging said driving member to retain said bracket and its marker in operative relationship with said markable element, a driving element movable in response to changes in magnitude of a condition, and motion-transmitting means interconnecting said driving element and said marker, the axis of one portion of said motion-transmitting means for all pivotal positions of said bracket coinciding with the pivotal axis of said bracket.

15. An instrument comprising a markable element, a driving member therefor, a marker, a bracket supporting said marker and movable about a pivotal axis, securing means including structure loosely carried by said bracket and releasably engaging said driving member to clamp said markable element to said driving member, a driving element movable in response to changes in magnitude of a condition, and motion-transmitting means interconnecting said driving element and said marker, the axis of one portion of said motion-transmitting means for all pivoted positions of said bracket coinciding with the pivotal axis of said bracket.

16. An instrument comprising a frame, a markable element, a driving member therefor, a marker, an arm supporting said marker for movement relative thereto, said arm being pivotally mounted on said frame beyond the periphery of said markable element and extending in front thereof, a pulley journaled on said arm, clamping means extending through said pulley and engageable with said driving member to clamp said markable element against said driving member, a driving pulley movable in response to changes in magnitude of a condition, idler pulleys having peripheral portions thereof supported tangential to the pivotal axis of said arm, and an endless belt driving said marker and interconnecting said driving and driven pulleys, said belt passing over said idler pulleys in a direction such that a portion thereof coincides with said pivotal axis, whereby upon release of said clamping means said arm and said marker may be swung away from said markable element without moving said marker relatively to said arm.

17. An instrument comprising a frame supporting a driving element movable in response to changes in the magnitude of a condition, a bracket, and means interconnecting said frame and said bracket for relative movement about a common pivotal axis, exhibiting structure supported on said bracket and movable relatively thereto, means for driving said structure under the control of said element comprising a geared driving connection including a gear mounted coaxial with said pivotal axis.

18. An instrument comprising a frame, exhibiting structure having a movable element, a bracket supporting said element, means interconnecting said frame and bracket for relative movement about a common pivotal axis, a driving member supported on said frame, motion-transmitting means interconnecting said member and said element and movable along a path of predetermined length, and means disposed adjacent to said pivotal axis and in cooperative relationship with said motion-transmitting means for maintaining constant said length of said path for all pivotal positions of said bracket.

RAYMOND W. ROSS.